(12) United States Patent
Parkala Srinivas et al.

(10) Patent No.: US 11,397,715 B2
(45) Date of Patent: Jul. 26, 2022

(54) DEFINING INDEXING FIELDS FOR MATCHING DATA ENTITIES

(71) Applicant: International Business Machines Corporation, Armonk, NY (US)

(72) Inventors: Shettigar Parkala Srinivas, Bangalore (IN); Soma Shekar Naganna, Bangalore (IN); Neeraj Ramkrishna Singh, Bangalore (IN); Abhishek Seth, Deoband (IN); Prabhakaran Ramalingam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 150 days.

(21) Appl. No.: 16/527,535

(22) Filed: Jul. 31, 2019

(65) Prior Publication Data

US 2021/0034591 A1    Feb. 4, 2021

(51) Int. Cl.
*G06F 16/00*        (2019.01)
*G06F 16/22*        (2019.01)
*G06F 16/23*        (2019.01)

(52) U.S. Cl.
CPC .......... *G06F 16/22* (2019.01); *G06F 16/2379* (2019.01)

(58) Field of Classification Search
CPC ............... G06F 16/86; G06F 16/9024; G06F 16/90335; G06F 16/22; G06F 16/2379; G06F 16/252; Y10S 707/99943; Y10S 707/99945; Y10S 707/99948
See application file for complete search history.

(56) References Cited

U.S. PATENT DOCUMENTS

| | | | |
|---|---|---|---|
| 5,852,820 A | 12/1998 | Burrows | |
| 6,907,422 B1 | 6/2005 | Predovic | |
| 8,560,505 B2 | 10/2013 | Chaturvedi | |
| 9,292,567 B2 | 3/2016 | Dua | |
| 9,727,664 B2 | 8/2017 | Luo | |
| 2008/0215546 A1 | 9/2008 | Baum | |
| 2008/0243885 A1* | 10/2008 | Harger | G06F 16/21 |
| 2013/0238631 A1* | 9/2013 | Carmel | G06F 16/288 707/742 |
| 2014/0281729 A1 | 9/2014 | Goldenberg | |
| 2015/0248440 A1* | 9/2015 | Takayama | G06F 16/22 707/737 |
| 2018/0089188 A1 | 3/2018 | Kharisma | |
| 2018/0089561 A1 | 3/2018 | Oliner | |
| 2018/0121520 A1* | 5/2018 | Degiere | G06F 16/24578 |
| 2018/0210957 A1* | 7/2018 | Altaf | G06F 16/9535 |
| 2018/0336235 A1* | 11/2018 | Peña Muñoz | G06F 16/219 |

OTHER PUBLICATIONS

Mell et al., "The NIST Definition of Cloud Computing", Recommendations of the National Institute of Standards and Technology, Special Publication 800-145, Sep. 2011, 7 pages.

* cited by examiner

*Primary Examiner* — Dinku W Gebresenbet
(74) *Attorney, Agent, or Firm* — David K. Mattheis; Maeve Carpenter

(57) ABSTRACT

Indexing and matching records in a data management system by defining entity indexing attributes associated with system records, receiving an incoming data entity, selecting a set of entity candidates according to the entity indexing attributes, matching the incoming entity to an entity candidate, generating an analysis of the entity candidate selection according to entity attribute effectiveness, and revising the entity indexing attributes according to the analysis.

20 Claims, 5 Drawing Sheets

DEFINING INDEXING FIELDS FOR MATCHING DATA ENTITIES

BACKGROUND

The disclosure relates generally to entity matching in data management. The disclosure relates particularly to defining weights for candidate entity attributes for their selection as indexing fields.

Master data management systems routinely match and link incoming data entities with existing data records held by the data management system. Matching records for a pair of data sets each having n records and lacking indices, can require up to $n^2$ comparisons. Indexing records into buckets using fields or attributes can reduce the number of comparisons necessary to match and link incoming and existing records to a single entity.

A data management system may define a portion of the fields of a record as an index. The corresponding attribute values in an incoming record can be hashed to create a normalized bucket value to use for comparisons to the bucket hash values of existing candidate records. Attribute values can be hashed individually or as a group of values. The hashes of the incoming record can be used by the system to identify existing records having similar or identical hash values as candidates for matching and linking to the incoming record. Data from the selected candidate records is compared to corresponding portions of the incoming record. Candidates scoring above a designated threshold in the comparison are considered matches to the incoming record.

SUMMARY

Aspects of the invention disclose methods, systems and computer readable media associated with indexing and matching entity records in a data management system by defining entity indexing attributes associated with system records, receiving an incoming data entity, selecting a set of entity candidates according to the entity indexing attributes, matching the incoming entity to an entity candidate, generating an analysis of the entity candidate selection according to entity attribute effectiveness, and revising the entity indexing attributes according to the analysis.

DETAILED DESCRIPTION

Figure 1:
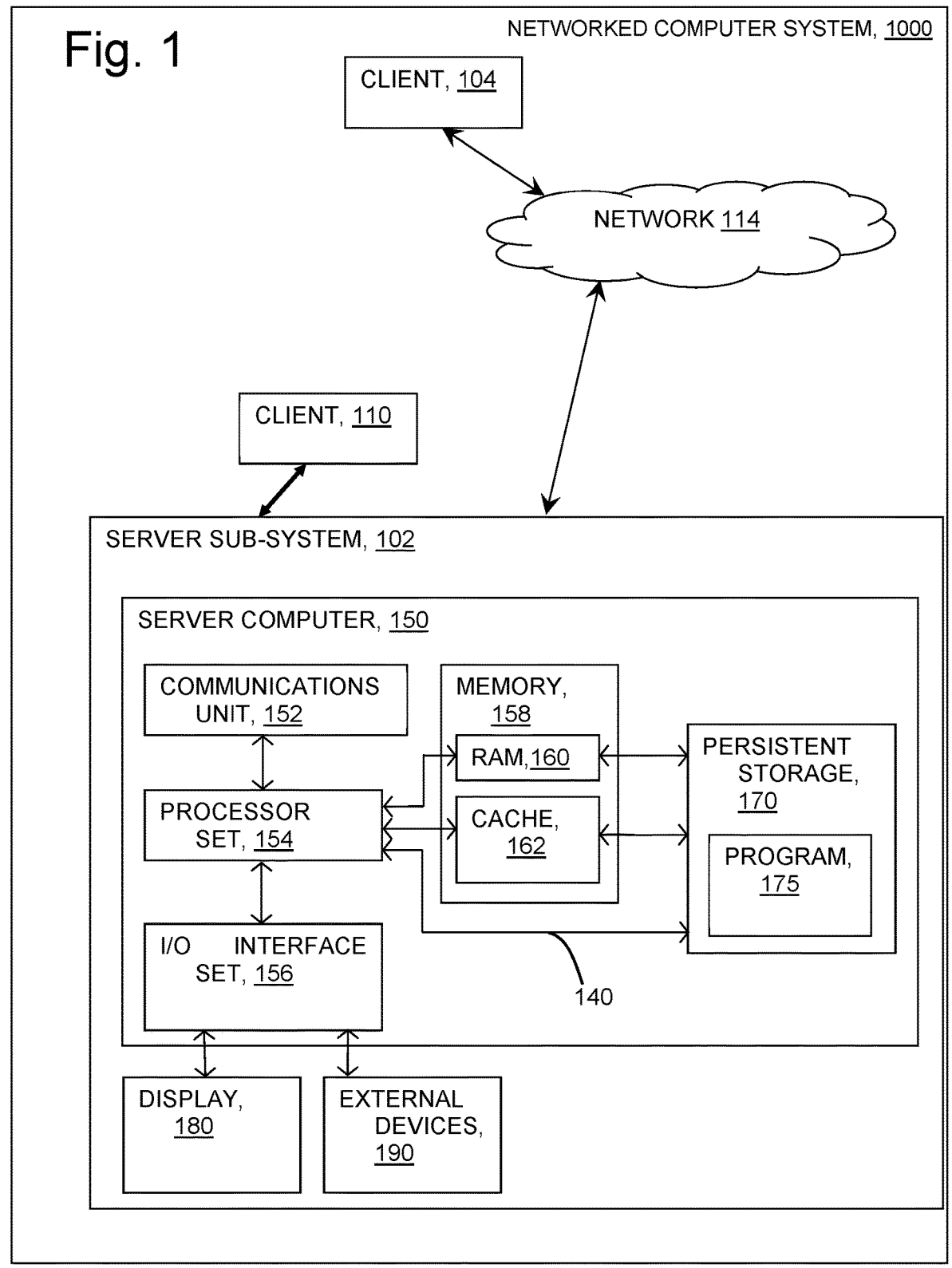
FIG. 1 provides a schematic illustration of a system, according to at least one embodiment of the invention.

Master data management systems match and link records from different sources to a single entity, creating a golden data record of cleaned and reconciled data for the identified entity. Records can include three types of attributes: (i) indexing, or bucketing attributes used to broadly define and select candidate records likely to match the incoming records without needing to compare the incoming record to all other records, (ii) matching attributes, which are compared between the incoming record and the selected set of candidate records to identify matching records, (iii) and payload attributes—all non-indexing and non-matching attributes carrying data regarding the entity of the record, but not used in defining the candidate selection criteria, or in matching records between the incoming and candidate records. Matching attributes can include indexing attributes. Candidate records likely to match incoming records can be selected using one or more indexing attributes applied to the data records.

Data record indices can be defined at the inception of the system using the expertise of the developer. Static indices derived according to the developer's expertise can be inefficient and are not subject to change as the system processes records. Inefficiencies inherent in the original attribute indices or arising from data record evolution can hamper overall system performance. What is needed is an adaptive set of attribute indices which can utilize performance feedback to improve efficiencies in candidate selection and can adapt to changes in data records over time.

Entity resolution provides for the matching and linking of records from multiple sources. Data can be standardized, categorized, bucketed (indexed), and compared in order for matching and linking to occur. After standardization, additional metadata attributes can be generated for individual records, expanding the scope of the records which can be used for comparisons. Metadata attributes can be mapped to the record in terms of phonetically similar strings, strings having two or more transposed characters in relation to the original string, similar address strings, similar names, and nicknames to expand the scope of the record to be used in selecting candidates for matching and linking to other records. As an example, a record for "Robert" can have nickname metadata: "Bob", and "Bobby" mapped to the record for use in matching and linking to other records having sufficient other record fields which match. Metadata attributes can be included as indexing and/or matching attributes.

In an embodiment, the values of the defined set of indexing attributes for an incoming record is cleaned and standardized as described above, including expanding the attributes with metadata to accommodate misspelling and transposed digits. The set of attribute values is hashed using a hashing function to yield a composite value to simplify the comparison to selected candidate records. In an embodiment, secure hashing algorithm 2 (SHA2) is used to create the hashes of the field(s). The hashed value is then be used to select candidate records having the same or similar hashed values for the set of defined indexing attributes.

In an embodiment, the values of the matching attributes of the incoming and existing records are compared. Records having more than a threshold degree of matching between their respective attributes are considered to be matching records. In an embodiment, records having more than 50% identical matching attributes are considered to be matching records. In an embodiment, the threshold can be set at 75% identical matching attributes. Other threshold levels can be used to increase the number of matching records with a lower threshold, at the possible expense of incorrectly matched records. In an embodiment, a higher threshold level can be used to decrease the likelihood of incorrectly matched records, at the possible expense of failing to match all records associated with a particular entity. One of ordinary skill in the art will appreciate that any number of threshold values can be used to increase or decrease the number of matching records returned.

In an embodiment, a feedback loop is used to check and improve the efficiency of the candidate selection process associated with the set of indexing/bucketing attributes. In this embodiment, after each incoming record has been matched to candidate records, all indexing, matching and payload attributes of the incoming and matched records are evaluated. In an embodiment, only the attributes of matched records exceeding a defined threshold of matching are evaluated. For each evaluated attribute, the frequency of occurrence (f1) among the selected candidates is determined. Frequency of occurrence is defined as the total number of times the attribute is present in the set of candidates divided by the total number of candidates considered. (As an example, 990 candidate records out of 1000 candidates considered had a phone number attribute for a frequency of occurrence of 990/1000, or 0.99.) The frequency of matching (f2) of each attribute is also determined. Frequency of matching is defined as the total number of times the attribute value matched divided by the total number of matched records considered. (As an example, 450 out of 500 matching records had matching phone numbers, for a frequency of matching of 450/500, or 0.90.)

In an embodiment, the method considers the nature of respective payload attributes in determining which records match. In this embodiment, numeric attribute values are considered matching if the two values both fall within a common range defined for the attribute (e.g., incoming value=attribute value +/−50, or street address values which refer to the same generalized address, 1200 Main st=1200 Main St, Apt 6A).

In an embodiment, the attributes are ranked according to their frequencies of occurrence and matching and weighted for each of the two frequencies from high to low according to their ranking for that frequency. An overall weight for each attribute is then determined as W=w1*f1+w2*f2. In an embodiment, the attributes are ordered from high to low according to their final weighting W. In an embodiment, the attributes are ordered from low to high according to their final weighting W. In an embodiment, the final ranking is used to evaluate the current set of indexing attributes and to determine if the set should be revised to include new attributes and/or exclude existing attributes from the set. In an embodiment, the final weightings are also used to revise which attributes are considered matching versus payload attributes, as attributes with high matching frequencies can become matching attributes and those with low matching frequencies can become payload attributes.

In an embodiment, attributes are evaluated according to a statistical profile relating to the relative significance of different attribute values across the population of records. The evaluation can consider all attributes or can be limited to those attributes identified as indexing/bucketing attributes. Attribute values of high significance, those relating to a percentage of records above a defined threshold, can be excluded from consideration as candidate selection index values as they will return too large a set of candidates, reducing system efficiency. A threshold level of significance can be set with values falling above the threshold anonymized or removed from consideration due to the large number of candidates which would result from their use as index values. In an embodiment, a threshold value of 3% is used to define the values to be considered in using the attribute for indexing and candidate selection purposes. As an example, the attribute "city" can be considered for selecting candidates, with only those values of city representing less than 3% of the overall population of records considered—all others above 3% viewed as anonymous values—in order to provide a manageable number of candidates for comparison to incoming records. Higher or lower threshold values can be set according to system resource availability to process larger numbers of indexed candidates.

In an embodiment, the overall size of the index or bucket associated with a particular attribute is considered as well as the significance threshold value. In this embodiment, after excluding highly significant values, the size of the average bucket associated with each of the values is determined as the quotient of the total occurrences of the remaining values and the number of unique remaining values. This average bucket size is then divided by the total number of records being considered (in millions) to determine the average bucket size per million records. This average is then compared to a threshold for bucket size per million records with values above the threshold excluded as representing buckets which are too large, and which will return too many candidates for matching. In an embodiment, a threshold of 50 per million records is used as an efficient sizing threshold. Larger or smaller thresholds can be used resulting in the use of more and fewer resources respectively, for processing the records.

In an embodiment, the total number of possible values of an attribute is considered. The attribute gender has a small number of possible values and is therefore considered a poor choice for an indexing/bucketing attribute as the number of buckets will be low and the number of records per bucket will be too high—producing too many candidates.

As an example of the above methodology, incoming records are considered using indexing attributes of phone number, and name. Selected candidates are then matched using phone number, name and gender. Payload attributes of personal identification number code, City, and State are then associated with the matched entity. Evaluation of the matched records indicates that adding City to the indexing attributes will yield a more refined set of candidates without an accompanying loss of matched records.

In an embodiment, incoming records are evaluated, and candidate records are selected using the defined indexing attributes. A second set of candidates are selected using the defined indexing attributes plus one or more attributes randomly selected from the matching and/or payload attributes. The matching records from the two sets of candidates are compared to determine the completeness of the set of matching records obtained using the expanded set of indexing attributes. In an embodiment, the randomly selected attributes from expanded sets of attributes having a completeness exceeding a defined threshold, are added to the defined indexing attributes. In this embodiment, the threshold is defined as 90% completeness (i.e., 90% of the matched records resulting from the comparison based on candidates using the original set of indexing attributes are present in the set of matched records resulting from the comparison based on candidates selected using the expanded set of indexing attributes). In this embodiment, randomly added attributes having high completeness scores (i.e., completeness scores exceeding a defined threshold) can be deliberately added to the indexing attributes in subsequent processing. Additional attributes can also be randomly added to indexing attribute sets containing the original indexing set plus attributes having a high completeness scoring. In an embodiment, multiple attributes, each having a high completeness score are added in combination to the original set of indexing attributes. As an example, parallel processing of incoming records using the original and randomly expanded sets of indexing/bucketing attributes can indicate that a high level of completeness of matched records is obtained when adding the attribute "city" to the indexing/bucketing attributes used for candidate selection, while also providing the benefit of a smaller set of selected candidates for comparisons.

FIG. 1 provides a schematic illustration of exemplary network resources associated with practicing the disclosed inventions. The inventions may be practiced in the processors of any of the disclosed elements which process an instruction stream. As shown in FIG. 1, a networked Client device 110 connects wirelessly to server sub-system 102. Client device 104 connects wirelessly to server sub-system 102 via network 114. Client devices 104 and 110 comprise master data management client programs (not shown) together with sufficient computing resources (processor, memory, network communications hardware) to execute the programs. As shown in FIG. 1, server sub-system 102 comprises a server computer 150. FIG. 1 depicts a block diagram of components of server computer 150 within a networked computer system 1000, in accordance with at least one embodiment of the present invention. It should be appreciated that FIG. 1 provides only an illustration of one implementation and does not imply any limitations with regard to the environments in which different embodiments can be implemented. Many modifications to the depicted environment can be made.

Server computer 150 can include processor(s) 154, memory 158, persistent storage 170, communications unit 152, input/output (I/O) interface(s) 156 and communications fabric 140. Communications fabric 140 provides communications between cache 162, memory 158, persistent storage 170, communications unit 152, and input/output (I/O) interface(s) 156. Communications fabric 140 can be implemented with any architecture designed for passing data and/or control information between processors (such as microprocessors, communications and network processors, etc.), system memory, peripheral devices, and any other hardware components within a system. For example, communications fabric 140 can be implemented with one or more buses.

Memory 158 and persistent storage 170 are computer readable storage media. In this embodiment, memory 158 includes random access memory (RAM) 160. In general, memory 158 can include any suitable volatile or non-volatile computer readable storage media. Cache 162 is a fast memory that enhances the performance of processor(s) 154 by holding recently accessed data, and data near recently accessed data, from memory 158.

Program instructions and data used to practice embodiments of the present invention, e.g., the master data management program 175, are stored in persistent storage 170 for execution and/or access by one or more of the respective processor(s) 154 of server computer 150 via cache 162. In this embodiment, persistent storage 170 includes a magnetic hard disk drive. Alternatively, or in addition to a magnetic hard disk drive, persistent storage 170 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 170 may also be removable. For example, a removable hard drive may be used for persistent storage 170. Other examples include optical and magnetic disks, thumb drives, and smart cards that are inserted into a drive for transfer onto another computer readable storage medium that is also part of persistent storage 170.

Communications unit 152, in these examples, provides for communications with other data processing systems or devices, including resources of client computing devices 104, and 110. In these examples, communications unit 152 includes one or more network interface cards. Communications unit 152 may provide communications through the use of either or both physical and wireless communications links. Software distribution programs, and other programs and data used for implementation of the present invention, may be downloaded to persistent storage 170 of server computer 150 through communications unit 152.

I/O interface(s) 156 allows for input and output of data with other devices that may be connected to server computer 150. For example, I/O interface(s) 156 may provide a connection to external device(s) 190 such as a keyboard, a keypad, a touch screen, a microphone, a digital camera, and/or some other suitable input device. External device(s) 190 can also include portable computer readable storage media such as, for example, thumb drives, portable optical or magnetic disks, and memory cards. Software and data used to practice embodiments of the present invention, e.g., master data management program 175 on server computer 150, can be stored on such portable computer readable storage media and can be loaded onto persistent storage 170 via I/O interface(s) 156. I/O interface(s) 156 also connect to a display 180.

Display 180 provides a mechanism to display data to a user and may be, for example, a computer monitor. Display 180 can also function as a touch screen, such as a display of a tablet computer.

Figure 2:
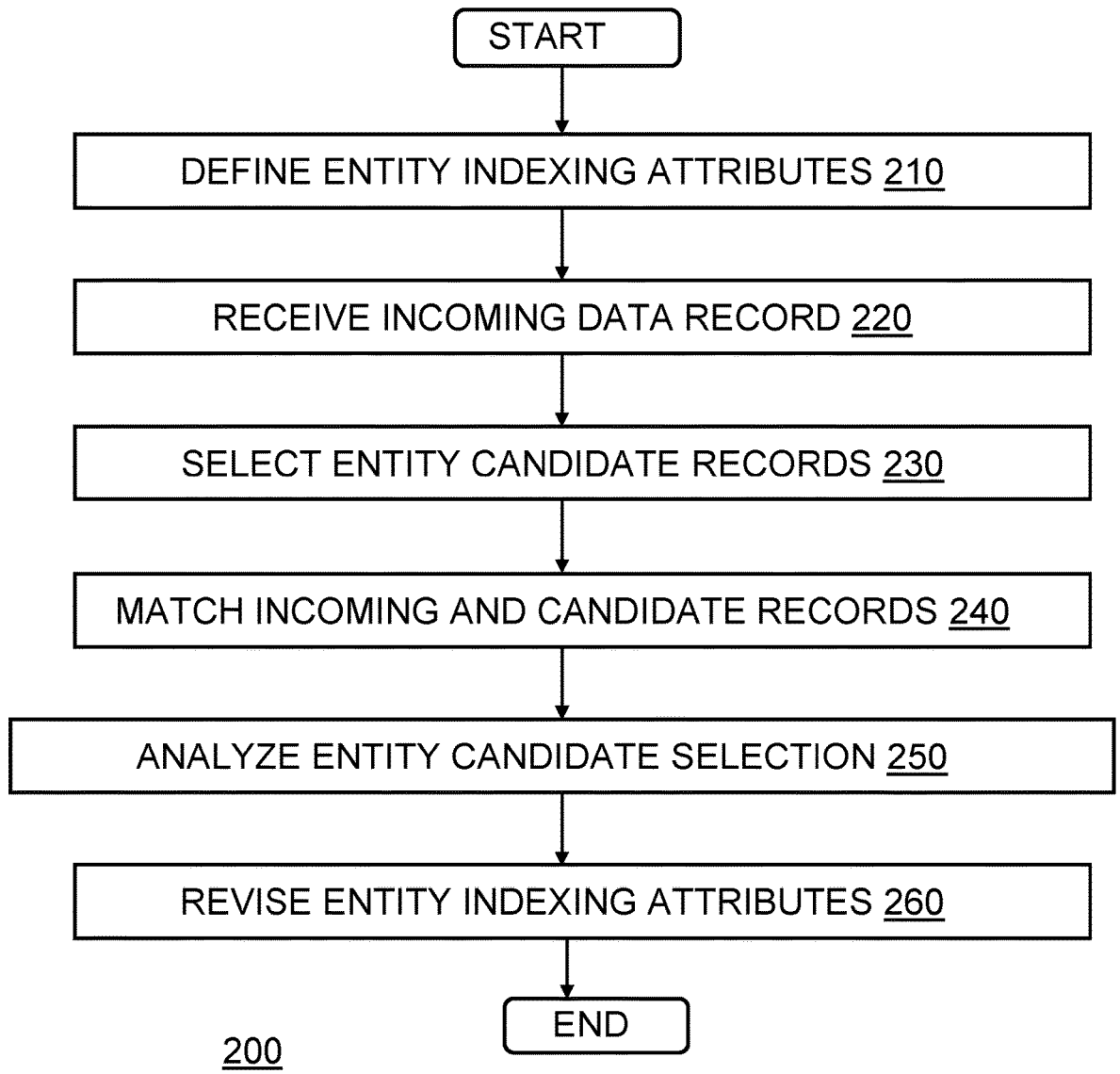
FIG. 2 provides a flowchart depicting an operational sequence, according to at least one embodiment of the invention.

FIG. 2 provides a flowchart 200, illustrating exemplary activities associated with the practice of the disclosure. After program start, the method relates to a system including a plurality of data records associated with identified entities. The records for each entity are considered a golden data record for the entity which includes all the cleaned, standardized and reconciled data associated with the entity. The data records include indexing/bucketing attributes used to broadly categorize the records, matching attributes, used to match existing and incoming records and associate the incoming records with the entity of the matched existing records, and payload attributes. Payload attributes are not used for indexing/bucketing, or for matching. The data of the payload attributes is added to the golden data record of the entity after a match between an incoming record and an existing record is found. The method indexes data records according to one or more entity indexing attributes at 210. The indexing attributes can include meta data attributes of the original data associated with the entity as well as the original data. The method hashes the values of the indexing attributes to facilitate comparisons of the values with the indexing attribute values of incoming data records. At 220, method receives an incoming data record. The method cleans and standardizes the data of the incoming record. The method adds phonetic equivalents, as well as strings having two or more transposed characters in relation to the original string, similar address strings, similar names, and nicknames to the incoming record to expand the scope of the matching process. The method creates hashes of the values of the indexing attributes of the incoming record. The method uses the hashed attribute values to select candidate records from amongst existing data records for comparison to the incoming record at 230. The selection of candidates based upon hashed indexing attribute values reduces the set of records to which the incoming record is compared, reducing the computational needs and the time required to identify matching records.

Comparison of the matching attribute values of the incoming and candidate records results in one or more matched records at 240. The matching attributes can include some or all of the indexing/matching attributes. After matching records are found, the method adds the data values of all the incoming record attributes to the golden record of the entity associated with the matching existing data record. The method reconciles the added values with the existing values, for example, broadening the values associated with the entity name to include nicknames, broadening address values to include variations on the address of the entity, inclusion of an apartment number, broadening to include abbreviations, st., as well as street, etc.

After matching records are found, the method generates an analysis of the matching process to determine the effectiveness of entity attributes in finding matching records at 250. The analysis considers all attributes of the set of selected candidates in relation to the incoming record attribute values. For each entity attribute, the method determines a frequency of occurrence and frequency of matching. The method then uses the frequencies to weight the entity attributes according to each frequency and determine an overall weight for each entity attribute according to the combination of the two frequency weights. The analysis also includes a statistical analysis of the entity attributes to determine the significance of each attribute—how many records each attribute relates to, as well as the size of the index or bucket associated with each attribute, and the number of possible values each attribute has. The method does not consider, and anonymizes, attributes associated with too large a bucket—those associated with a large number of records (i.e., a number of records above a threshold level), as well as attributes having too few possible values (i.e., a number of values below a threshold level) when selecting candidates.

The method then uses the overall weighting of the set of entity attributes and the results of the statistical analysis to evaluate the current set of indexing/bucketing attributes. The method subsequently uses entity attributes having a higher overall weighting (i.e., attributes having an overall weighting above a threshold value) and acceptable statistical analysis result as the indexing/bucketing attributes while removing current indexing/bucketing attributes having relatively low overall weighting (i.e., indexing/bucketing attributes having an overall weighting below a threshold value) or poor statistical analysis results, from use as indexing/bucketing attributes at 260.

Figure 3:
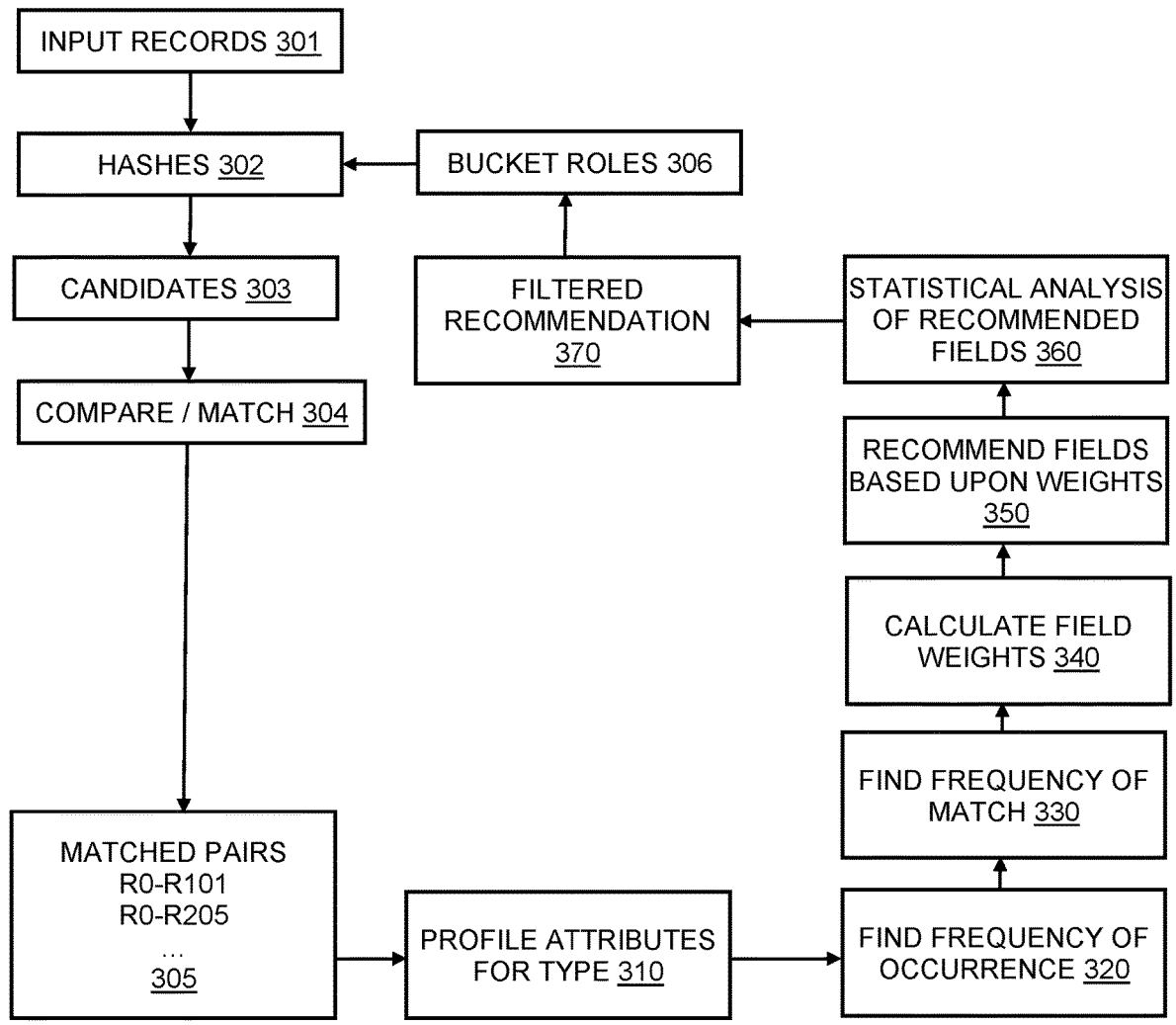
FIG. 3 provides a flowchart depicting an operational sequence, according to at least one embodiment of the invention.

Flowchart 300 of FIG. 3 illustrates an overlay of the disclosed invention with a typical workflow. Elements 301 to 306 represent a standard workflow. The method receives records at 301. The method hashes indexed values of the records at 302, according to bucket role provided from element 306. The method selects and compares candidate records at 304. The method provides an output of matched pairs of records/entities at 305. In an embodiment, the method matches incoming record R0 with records R101 and R205.

As provided in the figure, at 310 the method profiles the data from the received record to determine the type or domain of the fields for the record. The method reviews selected candidates regarding the respective fields of the record to determine the frequency with which the fields occur in the candidates at 320 and the frequency with which the fields match for matching records at 330. At 340, the method calculates a weight for each evaluated field. At 350, the method recommends new bucket roles based upon the calculated weights from 340. At 360, the method statistically analyzes the recommended attributes to determine the significance of the fields among the records of the data set. At 370 the method makes a recommendation based upon the combination of the originally recommended fields in view of the statistical analysis of the fields. The method uses this filtered recommendation of new bucket roles to revise the bucket role listing of element 306. In an embodiment, the method adds fields to the bucket roles of 306 and existing bucket roles of element 306 are removed.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
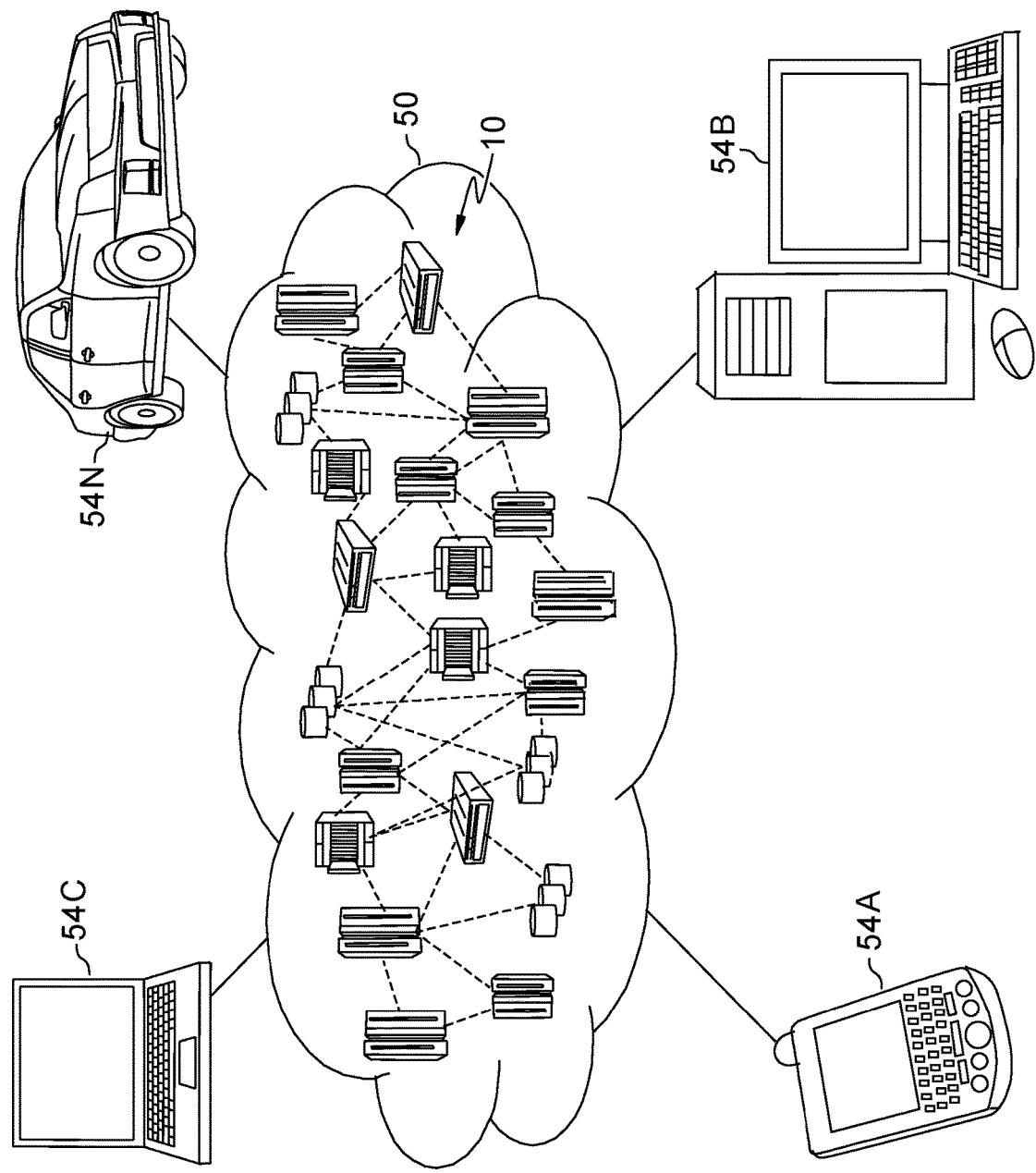
FIG. 4 depicts a cloud computing environment, according to at least one embodiment of the invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
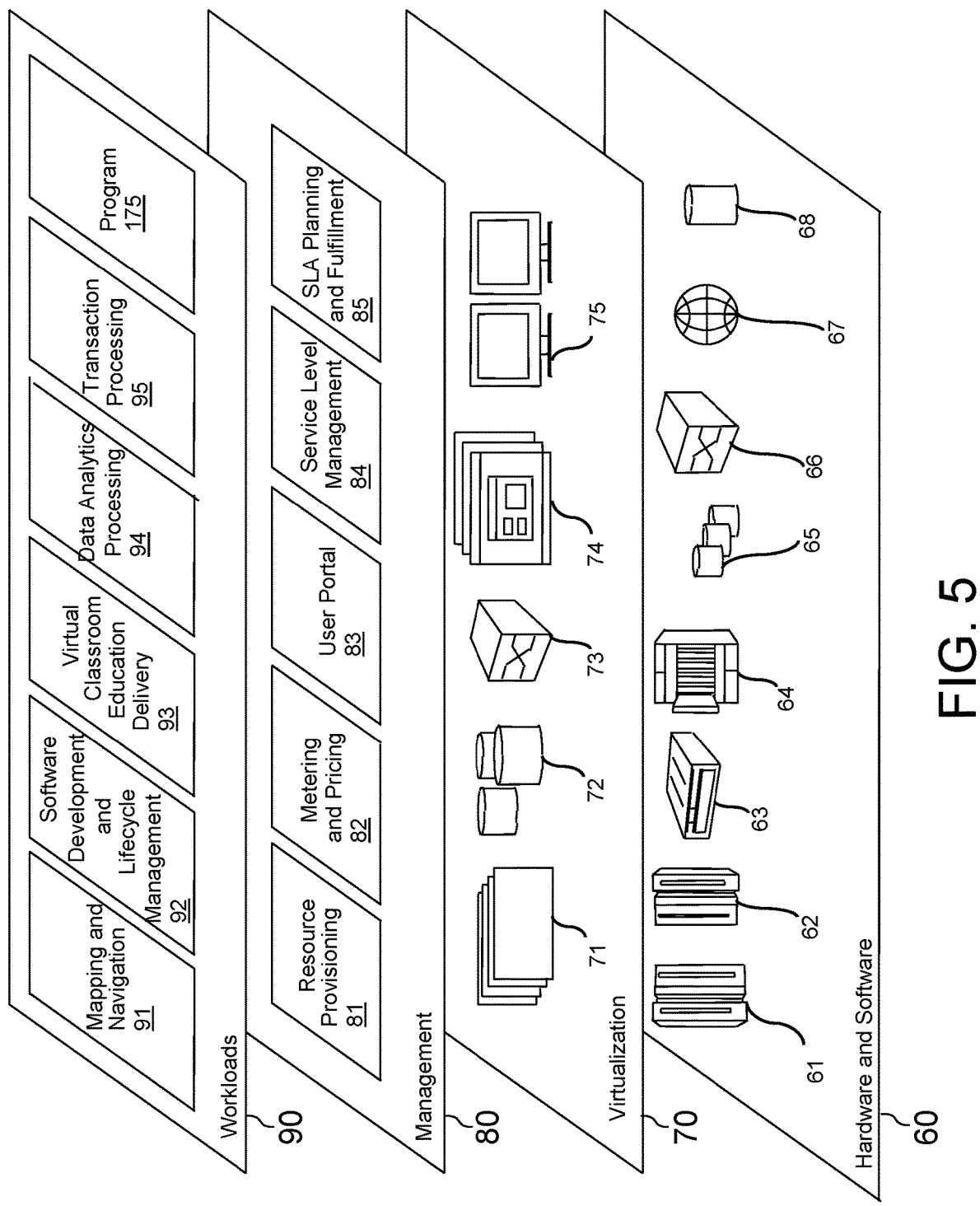
FIG. 5 depicts abstraction model layers, according to at least one embodiment of the invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and machine learning program 175.

The present invention may be a system, a method, and/or a computer program product at any possible technical detail level of integration. The invention may be beneficially practiced in any system, single or parallel, which processes an instruction stream. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer implemented method for indexing records in an entity resolution system, the method comprising:
    defining, by one or more computer processors, entity indexing attributes;
    receiving, by the one or more computer processors, an incoming data entity;
    selecting, by the one or more computer processors, a set of entity candidates according to the entity indexing attributes;
    matching, by the one or more computer processors, the incoming data entity to an entity candidate;
    generating, by the one or more computer processors, an analysis of the entity candidate selection according to an entity attribute effectiveness; and
    revising, by the one or more computer processors, the entity indexing attributes by adding an entity candidate payload attribute to the entity indexing attributes, according to the analysis.

2. The computer implemented method according to claim 1, wherein analyzing entity candidate selection according to the entity attribute effectiveness includes determining an entity attribute frequency of occurrence.

3. The computer implemented method according to claim 1, wherein analyzing entity candidate selection according to the entity attribute effectiveness includes determining an entity attribute frequency of matching.

4. The computer implemented method according to claim 1, wherein analyzing entity candidate selection according to the entity attribute effectiveness includes analyzing all entity attributes.

5. The computer implemented method according to claim 1, wherein analyzing entity candidate selection according to the entity attribute effectiveness includes determining an entity attribute statistical profile.

6. The computer implemented method according to claim 1, wherein analyzing entity candidate selection according to the entity attribute effectiveness includes evaluating an entity attribute value set size.

7. The computer implemented method according to claim 1, wherein revising the entity indexing attributes comprises removing an existing entity attribute index and recommending a new entity attribute for indexing.

8. A computer program product for managing application execution, the computer program product comprising one or more computer readable storage devices and stored program instructions on the one or more computer readable storage devices, the stored program instructions comprising:
    program instructions for defining entity indexing attributes;
    program instructions for receiving an incoming data entity;
    program instructions for selecting a set of entity candidates according to the entity indexing attributes;
    program instructions for matching the incoming data entity to an entity candidate;
    program instructions for generating an analysis of the entity candidate selection according to an entity attribute effectiveness; and
    program instructions for revising the entity indexing attributes by adding an entity candidate payload attribute to the entity indexing attributes, according to the analysis.

9. The computer program product according to claim 8, wherein the stored program instructions for analyzing entity candidate selection according to the entity attribute effectiveness include determining an entity attribute frequency of occurrence.

10. The computer program product according to claim 8, wherein the stored program instructions for analyzing entity candidate selection according to the entity attribute effectiveness include determining an entity attribute frequency of matching.

11. The computer program product according to claim 8, wherein the stored program instructions analyzing entity candidate selection according to the entity attribute effectiveness includes analyzing all entity attributes.

12. The computer program product according to claim 8, wherein the stored program instructions for analyzing entity candidate selection according to the entity attribute effectiveness include determining an entity attribute statistical profile.

13. The computer program product according to claim 8, wherein the stored program instructions for analyzing entity candidate selection according to the entity attribute effectiveness include evaluating an entity attribute value set size.

14. The computer program product according to claim 8, wherein the stored program instructions for revising the entity indexing attributes comprises removing an existing entity attribute index and recommending a new entity attribute for indexing.

15. A computer system for managing application execution, the computer system comprising:
    one or more computer processors;
    one or more computer readable storage devices; and
    stored program instructions on the one or more computer readable storage devices for execution by the one or more computer processors, the stored program instructions comprising:
        program instructions for defining entity indexing attributes;
        program instructions for receiving an incoming data entity;
        program instructions for selecting a set of entity candidates according to the entity indexing attributes;
        program instructions for matching the incoming data entity to an entity candidate;
        program instructions for generating an analysis of the entity candidate selection according to an entity attribute effectiveness; and
        program instructions for revising the entity indexing attributes by adding an entity candidate payload attribute to the entity indexing attributes, according to the analysis.

16. The computer system according to claim 15, wherein the stored program instructions for analyzing entity candidate selection according to the entity attribute effectiveness include determining an entity attribute frequency of occurrence.

17. The computer system according to claim 15, wherein the stored program instructions for analyzing entity candidate selection according to the entity attribute effectiveness include determining an entity attribute frequency of matching.

18. The computer system according to claim 15, wherein the stored program instructions analyzing entity candidate selection according to the entity attribute effectiveness includes analyzing all entity attributes.

19. The computer system according to claim 15, wherein the stored program instructions for analyzing entity candidate selection according to the entity attribute effectiveness include determining an entity attribute statistical profile.

20. The computer system according to claim 15, wherein the stored program instructions for analyzing entity candidate selection according to the entity attribute effectiveness include evaluating an entity attribute value set size.

\* \* \* \* \*